I. L. ROBERTS.
Assignor to THE ROBERTS-BREVOORT ELECTRIC COMPANY.
SECONDARY BATTERY.
No. 11,238. Reissued Apr. 26, 1892.
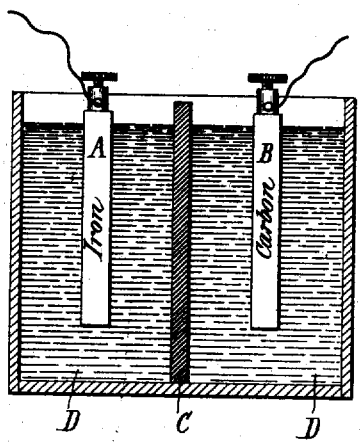
Witnesses:
Raphael Netter
Robt. F. Gaylord
Inventor
Isaiah L. Roberts
by Duncan & Page,
Attorneys.

UNITED STATES PATENT OFFICE.

ISAIAH L. ROBERTS, OF NEW YORK, N. Y., ASSIGNOR TO THE ROBERTS-BREVOORT ELECTRIC COMPANY, LIMITED, OF SAME PLACE.

SECONDARY BATTERY.

SPECIFICATION forming part of Reissued Letters Patent No. 11,238, dated April 26, 1892.

Original No. 464,665, dated December 8, 1891. Application for reissue filed January 28, 1892. Serial No. 419,613.

*To all whom it may concern:*

Be it known that I, ISAIAH L. ROBERTS, a citizen of the United States, and a resident of New York, in the county and State of New York, have invented a new and useful Improvement in Secondary Batteries, of which the following is a specification, reference being had to the drawing accompanying and forming a part of the same.

The subject of my present specification is a new and improved secondary or storage battery, the nature of which is as follows: I employ any convenient form of cell or jar, in which, as electrodes, I use a plate or mass of metallic iron and a conductor or plate of a material electro-negative to iron, preferably carbon, similar to the ordinary negative carbon element of a galvanic battery. For the excitant or solution I use a solution of chloride of iron. If both electrodes are immersed in this solution and a current passed through the battery from the iron to the carbon, iron is deposited on the iron plate and perchloride of iron formed in solution. If the cell be divided by the ordinary porous diaphragm of an electric battery, which is permeable by liquids, the formation of the perchloride in the carbon-compartment is greatly facilitated, but in either event supposed the local action or chemical recombination of the elements, when the charging-current is interrupted, is undesirable. In order, therefore, to prevent or impede this local action, I separate the electrodes by a diaphragm of any suitable form of the kind which I call "non-porous," for the reason that they are practically impervious to fluids under ordinary circumstances, and yet are electrolytic, in so far that they permit electrolytic action to take place through them. For such diaphragms I have obtained numerous patents, and I need only state that they may be made of ordinary porous jars or plates, the pores of which are filled with gelatinized silicate of soda or starch paste, or the like, or they may be composed of a material known in commerce as "fibrite," or vulcanized fiber, which, when immersed in the solution, becomes a good conductor. I have found that this material is admirably adapted for this purpose and prefer to use it in my battery. Before charging the battery I fill each compartment of the cell, as above stated, with a solution of chloride of iron, which produces no appreciable effect or action, however, of itself. To charge this battery, the positive pole of the dynamo or other source of electrical energy is connected to the carbon electrode and the negative to the iron. The passage of the charging-current decomposes the chloride of iron in solution in the iron-compartment, carrying the chlorine radical over to the carbon electrode and depositing metallic iron on the iron plate. The transferred chlorine is taken up by the chloride of iron in the carbon or anode compartment, one additional atom of chlorine being absorbed for each atom of iron present in the chloride-of-iron solution ($Fe_2CL_4$) in the carbon-compartment, forming perchloride of iron, ($Fe_2CL_6$,) and this continues until the solution in the iron-compartment is depleted or that in the carbon-compartment has absorbed its full quota of chlorine. The device thus becomes a source of electrical energy of great value on account of its capacity and steady action; but the return to the original conditions existing before the electrical current is passed through the battery is not affected to any appreciable extent until the circuit between the electrodes is closed, because, owing to the fact that the fluids on the opposite sides of the substantially impervious diaphragm are not permitted to intermingle, the local action is very slight. On closing the circuit of the battery the perchloride returns to the condition of chloride of iron and the excess of chlorine goes back to the iron electrode, with which it recombines.

In the accompanying drawing the above-described battery is shown in vertical central section.

A is the iron electrode or plate; B, the carbon electrode; C, the intermediate diaphragm or partition of fibrite, and D D the solution of chloride of iron.

While I have described herein the preferred form of battery embodying my invention, I do not limit myself to such exact form. For example, I may use as the electrolyte a solution of sulphate of iron, which, like the chloride, has the property of absorbing and giving up under similar conditions the acid radical. I may also use other materials for the electrodes, as will be well understood—such, for example, as carbon or those upon which iron may be deposited, or from which the acid radical may be liberated, and which will not be injuriously affected by such action.

What I claim is—

1. In a secondary or storage battery, the combination of the electrodes with an electrolyte of a salt of iron, which is capable of absorbing an acid radical, and a non-porous electrolytic diaphragm interposed between the electrodes, as set forth.

2. In a secondary or storage battery, an iron electrode and an element or plate electronegative thereto in a solution of chloride of iron, in combination with a non-porous electrolytic diaphragm interposed between the electrodes, as set forth.

3. In a secondary or storage battery, the electrodes of iron and carbon, respectively, in a solution of chloride of iron, in combination with a partition or diaphragm intermediate to the electrodes and composed of fibrite, as set forth.

ISAIAH L. ROBERTS.

Witnesses:
ROBT. F. GAYLORD,
ERNEST HOPKINSON.